United States Patent
Hayami et al.

(10) Patent No.: US 7,576,769 B2
(45) Date of Patent: Aug. 18, 2009

(54) INSPECTION DEVICE AND INSPECTION METHOD

(75) Inventors: Kenichi Hayami, Tokyo (JP); Masaaki Kaneko, Tokyo (JP)

(73) Assignee: TDK Corporation, Tokyo (JP)

( * ) Notice: Subject to any disclaimer, the term of this patent is extended or adjusted under 35 U.S.C. 154(b) by 812 days.

(21) Appl. No.: 10/971,085

(22) Filed: Oct. 25, 2004

(65) Prior Publication Data

US 2005/0094542 A1  May 5, 2005

(30) Foreign Application Priority Data

Oct. 29, 2003  (JP)  ............................. 2003-368464

(51) Int. Cl.
  *H04N 7/18*  (2006.01)
  *H04N 9/47*  (2006.01)
(52) U.S. Cl. .......................................... 348/86; 348/61
(58) Field of Classification Search .................. 348/94; 382/141–149
  See application file for complete search history.

(56) References Cited

U.S. PATENT DOCUMENTS

| | | | | |
|---|---|---|---|---|
| 4,876,728 A | * | 10/1989 | Roth | 382/153 |
| 5,574,801 A | * | 11/1996 | Collet-Beillon | 382/150 |
| 5,803,702 A | * | 9/1998 | Mullins et al. | 414/788.7 |
| 6,493,079 B1 | * | 12/2002 | Piacentini | 356/240.1 |
| 7,345,698 B2 | * | 3/2008 | Abbott et al. | 348/86 |
| 2002/0008203 A1 | * | 1/2002 | Chang | 250/341.8 |

FOREIGN PATENT DOCUMENTS

JP  6-215511  8/1994

OTHER PUBLICATIONS

Patent abstract of Japan, JP 11-185416 A, Jul. 9, 1999.

* cited by examiner

*Primary Examiner*—Tung Vo
*Assistant Examiner*—Anner Holder
(74) *Attorney, Agent, or Firm*—Oblon, Spivak, McClelland, Maier & Neustadt, P.C.

(57) ABSTRACT

A deviation amount of a top position of a convex surface of a protruding portion formed on a flat member and a deepest position of a concave surface on the back side of the convex surface, is obtained in XY-coordinates in a plane parallel to an extension plane of the flat member. An annular image obtained by illuminating the concave surface is photographed, and the XY-coordinates of the deepest position of the concave surface are obtained based on the image thus obtained. Regarding the convex surface, the X-coordinate and the Y-coordinate of the top position of the convex surface are respectively obtained by a front camera having an image taking optical axis parallel to the extension plane of the flat member and a side camera having an image taking optical axis parallel to the plane and perpendicular to the image taking optical axis of the front camera, and the deviation amount and deviation direction are obtained based on their respective XY-coordinates obtained.

1 Claim, 3 Drawing Sheets

INSPECTION DEVICE AND INSPECTION METHOD

BACKGROUND OF THE INVENTION

1. Field of the Invention

The present invention relates to an inspection device and a method of inspecting a positional deviation in a predetermined XY-plane of a top position of a convex surface of a protruding portion formed on a flat member and a deepest position of a concave surface constituting a back surface of the convex surface.

2. Related Background Art

When, for example, forming a protruding portion on a flat metal sheet, a method like pressing is adopted, in which male and female dies are used. When forming a member of a flat configuration with a protruding portion from a material of a relatively low melting point, a method like injection molding is adopted, in which male and female molds are used. Usually, in a protrusion obtained by such forming methods, assuming that the plane in which the protruding portion is formed is one defining XY-coordinates, it is considered that the XY-coordinates of the top position of the convex surface side and the XY-coordinates of the deepest position of the concave surface side coincide with each other. Even if a positional deviation is generated in these coordinates, the adverse effect thereof is regarded as substantially negligible, and the member obtained is used as it is.

A specific example of a protruding portion on a metal plate obtained by pressing is a dimple formed in a magnetic head of a hard disk drive (see JP 06-215511 A or JP 11-185416 A). Such a dimple consists of a protruding portion of a configuration substantially constituting a part of a spherical surface obtained by performing pressing on a thin metal plate with large spring constant called a load beam. In a hard disk drive, this dimple serves to stabilize the floating attitude of a magnetic head slider that effects recording and reproduction of information to and from a magnetic recording medium while floating over the magnetic recording medium while maintaining a minute gap therebetween.

In the case of a dimple in a magnetic head as mentioned above, the magnetic head slider supported by the dimple has recently been reduced more and more in size and weight. To support this small and light member in a stable manner, it is necessary to accurately measure, for example, the XY-coordinates of the top position of the convex surface of the dimple, and make the XY-coordinates coincide with the XY-coordinates of the center of the magnetic head slider. However, due to the construction of a magnetic head, it is rather difficult to directly measure the dimple top position when mounting the magnetic head slider. Therefore, in some cases, the XY-coordinates of the deepest position of the dimple concave surface, which are easier to measure, are adopted instead of the XY-coordinates of the top position of the convex surface.

As stated above, there may be, if slight, a deviation between the XY-coordinates of the top position of the dimple convex surface and those of the deepest position of the dimple concave surface. When the floating amount of the magnetic head slider is further reduced, and a further improvement in terms of stability in attitude while floating is required, it is necessary to evaluate this deviation amount, and take the deviation amount into consideration when mounting the magnetic head slider.

As described above with reference to the case of the dimple of a magnetic head, when a protruding portion is formed on a flat member, it is necessary to evaluate a positional deviation between the top position of the convex surface and the deepest position of the concave surface. However, when an attempt is made to control the fixing positions, mounting conditions, attitudes, etc. of other members by means of this protruding portion, the following problem is involved: in many cases, when actually controlling the fixing positions, etc. of other members, the protruding portion comes into contact with the other members, is hidden behind the other members, etc., thus making it difficult to directly measure the top position of the convex surface of the protruding portion. Thus, when the requisite accuracy for the fixing positions, etc. becomes higher, it will be inevitably necessary to previously obtain the relationship between the XY-coordinates of the top position of the convex surface and those of the deepest position of the concave surface regarding the protruding portion as described above, and to obtain, at the time of control, the requisite XY-coordinates of the top position of the convex surface from the actual measurement values of the deepest position of the concave surface, which are easier to measure.

Further, if the positional deviation between the XY-coordinates of the top position of the convex surface and those of the deepest position of the concave surface is to be eliminated or mitigated, it will be necessary to improve, for example, the positional accuracy of the male and female dies pressed together in the pressing process. However, it is rather difficult to directly obtain the positional accuracy of the top position of the convex surface of the male die and the deepest position of the concave surface of the female die during pressing, and it would be easiest and most efficient to evaluate the positional accuracy from the product actually obtained by the pressing. Usually, it is not easy to ascertain the arrangement of the convex surface top position and the concave surface deepest position of this product by simultaneously photographing them with a single camera, or to ascertain their respective positions by means of a single measurement system. Given the fact that the positional accuracy required in such cases has not been so high, no definite method for such measurement has been established as yet.

SUMMARY OF THE INVENTION

The present invention has been made in view of the above problem in the prior art. It is an object of the present invention to provide an inspection device and an inspection method which make it possible to easily and simply inspect a positional deviation in the XY-direction between a top position of a convex surface and a deepest position of a concave surface constituting the back side of the concave surface of a protruding portion formed on a flat plate-like member.

To attain the above object, according to the present invention, there is provided an inspection device that inspects a positional deviation in a predetermined XY-plane of a top position of a convex surface of a protruding portion formed on a flat member and a deepest position of a concave surface constituting a back surface of the convex surface, the inspection device including: a lower camera arranged substantially below a portion assumed to be a center of the concave surface of the protruding portion and having an image taking optical axis perpendicular to the predetermined XY-plane; a front camera having an image taking optical axis parallel to the predetermined XY-plane and directed toward the flat member; a side camera having an image taking optical axis parallel to the predetermined XY-plane, directed toward the flat member, and perpendicular to the image taking optical axis of the front camera; and a control means that arranges images obtained by the lower camera, the front camera, and the side camera in a coordinate system in the predetermined XY-plane to obtain positional data.

In the inspection device described above, it is only necessary for the image taking optical axes of the front camera and the side camera to be in the same plane, and there is no need for the optical axes to be orthogonal to each other. Further, in the above-described inspection device, it is desirable to further provide a movable ring-like light source having a ring-like light emitting region whose center is the image taking optical axis of the lower camera.

Further, to attain the above object, according to the present invention, there is provided a method of inspecting a positional deviation in a predetermined XY-plane of a top position of a convex surface of a protruding portion formed on a flat member and a deepest position of a concave surface constituting a back surface of the convex surface, the method including: applying light to the concave surface from substantially below a portion assumed to be a center of the concave surface of the protruding portion in a direction perpendicular to the predetermined XY-plane and photographing an image obtained through reflection of the light on the concave surface; obtaining coordinates in the predetermined XY-plane of the deepest position of the concave surface based on the image; photographing the convex surface of the protruding portion by a front camera having an image taking optical axis parallel to the predetermined XY-plane and directed toward the flat member; obtaining coordinates in the predetermined XY-plane of the top position of the convex surface based on an image obtained by the front camera; photographing the convex surface of the protruding portion by a side camera having an image taking optical axis parallel to the predetermined XY-plane, directed toward the flat member, and different from the image taking optical axis of the front camera; obtaining coordinates in the predetermined XY-plane of the top position of the convex surface based on an image obtained by the side camera; and comparing the coordinates in the predetermined XY-plane of the deepest position of the concave surface with the coordinates in the predetermined XY-plane of the top position of the convex surface. Note that in the inspection method described above, it is only necessary for the image taking optical axes of the front camera and the side camera to be in the same plane, and there is no need for the optical axes to be orthogonal to each other.

According to the present invention, it is possible to easily and simply inspect and evaluate a positional deviation in the XY-direction between the top position of the convex surface and the deepest position of the concave surface constituting the back side of the concave surface of a protruding portion formed on a flat plate-like member as well as the deviating direction. Thus, in a magnetic head manufacturing process, for example, by measuring the concave surface deepest position, which is easy to measure, it is possible to easily make the XY-coordinates of the central portion of the magnetic head slider coincide with the XY-coordinates of the top position of the dimple convex surface, and to set the alignment direction thereof to a predetermined direction. While in the embodiment, etc. described below, the convex side is principally used for positioning, etc., the present invention is also applicable to the case in which the concave side is used for positioning, etc.

Further, it is also possible to perform positional deviation evaluation, etc. according to the present invention on a product actually obtained, and to feed back the evaluation result to the dies, etc. For example, in the case in which a protruding portion is formed on a flat plate-like member by using a pressing machine or the like, or in the case in which a flat plate-like member with a protruding portion is formed by using an injection molding machine, this feedback is effected to adjust the arrangement of the male and female dies, whereby the positional deviation in the obtained product is mitigated, thus improving the quality of the product.

DESCRIPTION OF THE PREFERRED EMBODIMENT

Figure 1:
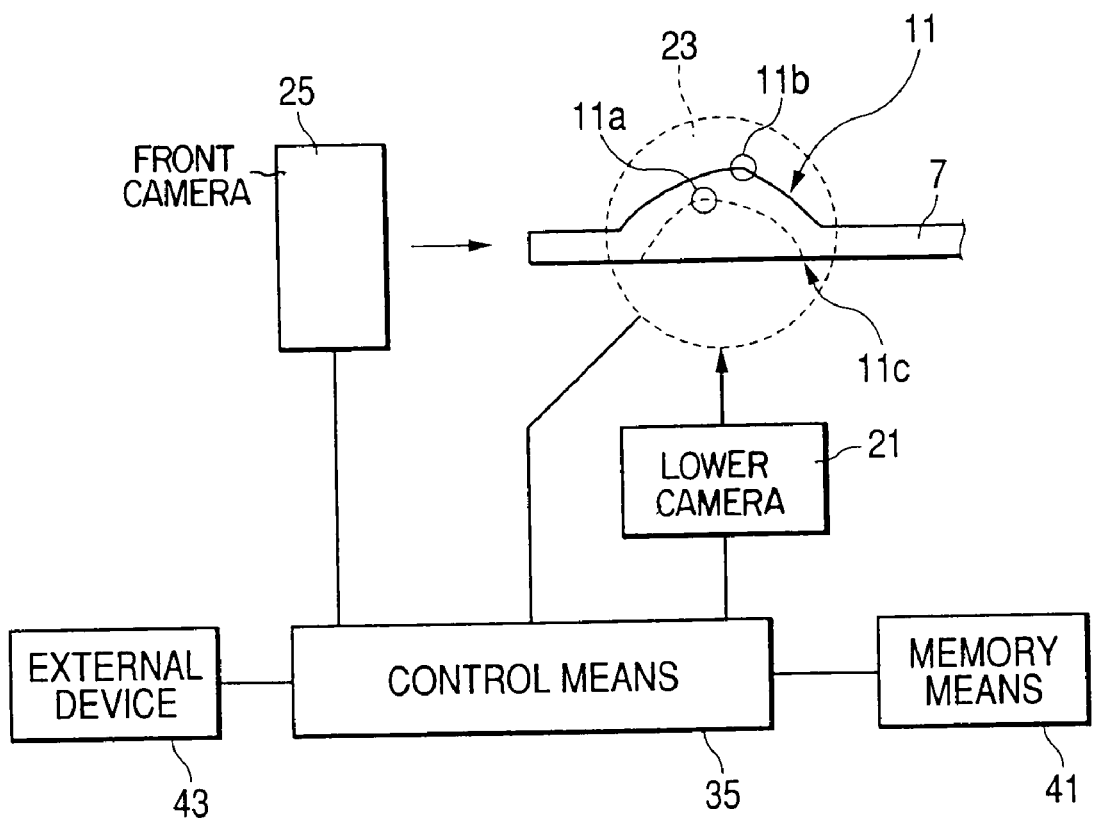
FIG. 1 is a schematic diagram showing the construction of an embodiment of the present invention.

In the following, an inspection device according to an embodiment of the present invention will be described with reference to the drawings. FIG. 1 shows an embodiment of the present invention for obtaining a positional deviation between a top position 11b of a front side (convex surface) and a deepest position 11a of a back side (concave side) of a protruding portion 11 formed on a flat member 7. The present invention employs cameras including a lower camera 21, a side camera 23 (see FIG. 4), and a front camera 25, a control means 35 for analyzing images obtained by these cameras, and a memory means 41 for storing data obtained by the control means 35. Further, the control means 35 is also connected to an external device 43 for displaying, as needed, data or the like obtained, or for executing further processes by using the above data, etc.

Figure 2:
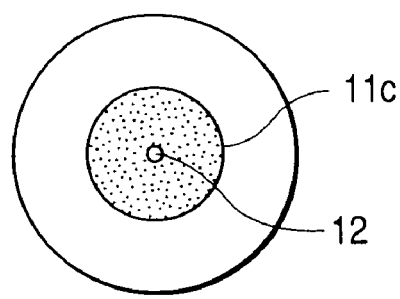
FIG. 2 is a diagram schematically showing an image obtained by illuminating a concave portion with a lower camera.

The lower camera 21 is arranged substantially below the portion assumed to be the center of the concave surface of the protruding portion 11, and has an image taking optical axis substantially perpendicular to an extension plane of the flat member 7. The front camera 25 has an image taking optical axis which is in or parallel to the extension plane of the flat member 7 and which is directed to the flat member 7. The side camera 23 has an image taking optical axis which is in or parallel to the extension plane of the flat member 7, which is directed to the flat member 7, and which is perpendicular to the image taking axis of the front camera 25. Further, around the lower camera 21, there is arranged a ring-like light source 22 (see FIG. 3) or a coaxial light source (not shown); by illuminating the protruding portion 11 from the back side by the light source 22, an image as shown in FIG. 2 is obtained.

The light illuminating the concave surface of the protruding portion 11 is reflected by the innermost portion of the concave surface (the deepest position 11a) or a portion in the vicinity thereof to form an annular image 12 inside the concave surface. In the image, an outer periphery 11C of the concave surface is shown as the outer periphery of an annular dark portion, and the deepest position 11a, which is substantially perpendicular to the optical axis of the illumination light, is shown as a bright spot (an image 12) in the dark portion. The concave surface of the protruding portion 11 is made of the same material as the back surface of the flat member 7, which constitutes the periphery of the concave surface, so that, were it not for the image 12, it would be rather difficult for the boundary, etc. thereof to be identified as an image; by using this image 12, however, the XY-coordinates of the deepest position 11a of the concave surface can be easily obtained.

Figure 3:
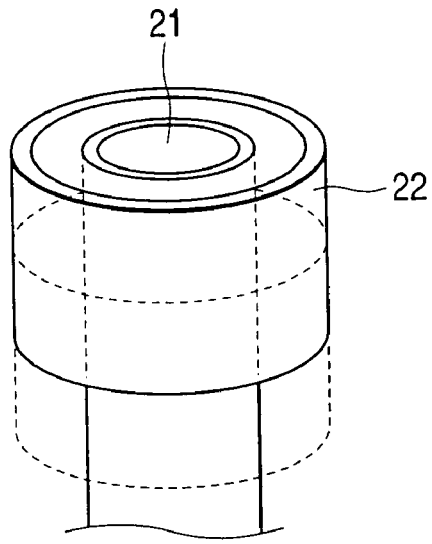
FIG. 3 is a diagram showing the positional relationship between the lower camera and a ring-like light source.

The ring-like light source 22, the mounting state of which is schematically shown in FIG. 3, is movable, and, through this movement, the position of the circular image 12 is searched for, making it possible to facilitate the calculation of the XY-coordinates of the deepest position 11a. Further, the lower camera 21 can move parallel to the extension plane of the flat member 7 together with the light source 22; even when the concave surface is not of a precise spherical configuration, an image can be obtained which makes it possible to detect the deepest position 11a through adjustment of the light illuminating position, etc. The image thus obtained is analyzed by the control means 35, and the XY-coordinates of the deepest position 11a of the concave surface are obtained.

Figure 4:
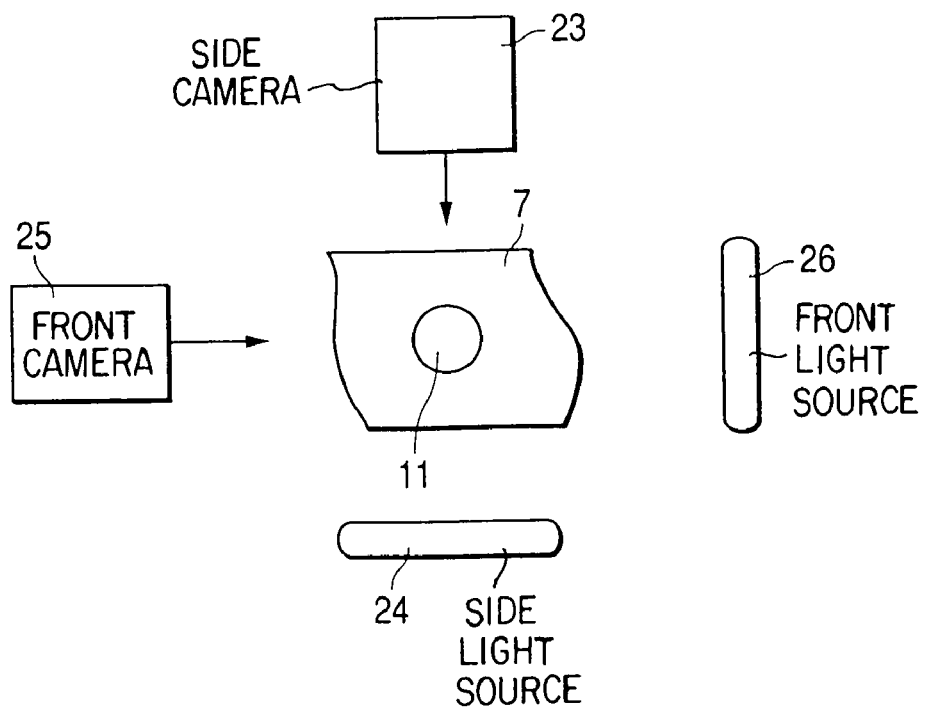
FIG. 4 is a schematic view, as seen from above, of an embodiment of the present invention.

Further, as shown in FIG. 4, which is a plan view of a construction according to the present invention, it is desirable to arrange a substantially plate-like front light source 26 at a position opposed to the front camera 25 with the protruding portion 11 therebetween, and to arrange a substantially plate-like side light source 24 at a position opposed to the side camera 23 with the protruding portion 11 therebetween. Through the arrangement of these light sources, it is possible to obtain the effect of clarifying the contour of the protruding portion 11, enabling each camera to take a clearer image. The images obtained by the front camera 25 and the side camera 23 are analyzed by the control means 35, and the X-coordinate and the Y-coordinate of the top position 11b of the convex surface are obtained.

From the XY-coordinates of the top position 11b of the protruding portion and the XY-coordinates of the deepest position 11a of the concave portion, which are calculated by using the images obtained by the cameras, it is possible to further obtain their respective deviation amounts, deviation direction, etc. The obtained data, such as the XY-coordinates, deviation amounts, etc., are stored in the memory means, and are used as needed thereafter in the processes using this flat member. By using the inspection device of the present invention constructed as described above, it is possible to grasp the forming precision of the protruding portion 11 of the flat member 7; when actually using the member, data is obtained regarding the forming position, for example, of the deepest position 11a of the concave surface, which is easy to re-detect, thereby making it possible to grasp the XY-coordinates, etc. of the top position of the convex surface, which cannot be detected. Further, it is not absolutely necessary for the lower camera to be arranged vertically below the flat member 7 as in this embodiment; it is also desirable for the camera to be appropriately set above the member or at an angle with respect thereto so as to be in conformity with the configuration, protruding direction, etc. of the protruding portion.

In the above description of this embodiment, the XY-plane defining the XY-coordinates is assumed to be a plane consisting of an extension of the flat member. However, the XY-coordinate system in the present invention is not restricted to this plane; it is desirable for the XY-coordinate system to be arbitrarily set as a predetermined XY-plane according to the configuration, protruding direction, etc. of the protruding portion. Further, it is only necessary for the optical axes of the side camera and the front camera to be respectively parallel to predetermined XY-planes, and there is no need for their image taking axes to be orthogonal to each other. Further, the lower camera may be arranged below the protruding portion such that its image taking axis is at an arbitrary angle with respect to a predetermined XY-plane. That is, the arrangement of the individual cameras is determined according to the arrangement of the subject or the positional relationship between the cameras and the illuminating members, previously obtaining the mutual relationship between the coordinate systems in the image taking fields of view.

Embodiment

Figure 5:
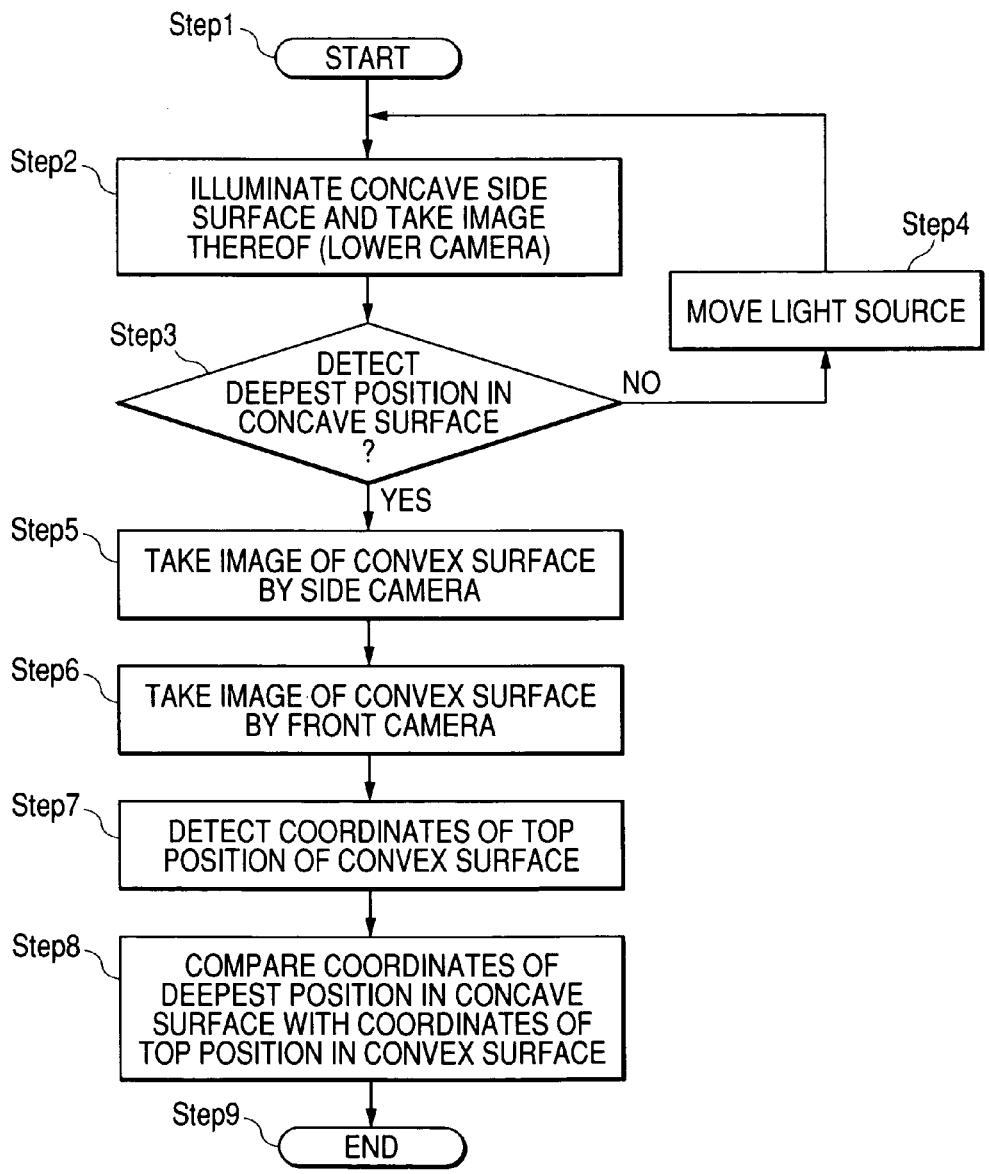
FIG. 5 is a flowchart illustrating an inspection method according to the present invention.

Next, a method of actually detecting the deviation amount and the deviation direction of the top position of the convex surface and the deepest position of the concave surface will be described. FIG. 5 is a flowchart showing the steps of this detection method. First, in step 1, the flat member 7 is fixed such that the protruding portion 11 is situated at a position where the image taking optical axes of the cameras substantially coincide with each other, and the actual detecting process is started.

In step 2 of the actual process, image taking is performed on the concave surface by the lower camera 21, with the concave surface of the protruding portion 11 being illuminated by the light source 22. On the basis of the annular image 12 in the concave surface obtained as shown in FIG. 2 by this image taking operation, the control device 35 obtains the XY-coordinates of the deepest position 11a of the dimple concave surface. Subsequently, in step 3, a judgment is made as to whether the XY-coordinates have been identified or not. In the case in which they have not been identified, movement of the light source 22, etc. is effected to vary the annular image 12 obtained, and the procedure returns to step 2, where the operation of obtaining the XY-coordinates of the deepest position 11a is conducted again. When the XY-coordinates are obtained, the procedure advances to the next step, where the coordinates of the top position of the convex surface are detected.

In step 5, image taking is performed on the convex surface by the side camera 23, and the X-coordinate on the X-axis, which is perpendicular to the image taking optical axis of the camera, of the top position of the convex surface is obtained from the resultant image. Thereafter, in step 6, image taking is performed on the convex surface by the front camera 25, and the Y-coordinate on the Y-axis, which is perpendicular to the image taking optical axis of the camera, of the top position of the convex surface is obtained from the resultant image (step 7). By using the XY-coordinates obtained, the deviation amount, the deviation direction, etc. of the top position 11b of the convex surface and the deepest position 11a of the concave surface are obtained. Through the above-described steps, it is possible to easily and simply inspect the positional deviation in the XY-direction of the top position of a convex surface of a protruding portion formed on a flat member and the deepest position of a concave surface constituting the back side of the convex surface.

The present invention is intended for obtaining the positional relationship between the top position of a convex surface of a protruding portion formed on a flat member and the deepest position of a concave surface constituting the back surface of the convex surface, and is applicable, for example, to a dimple in a magnetic head. However, the object of application of the present invention is not restricted to a magnetic head; it is applicable to any object as long as it is a miniature member requiring high accuracy positioning or the like wherein this positioning or the like is to be effected by means of a protruding portion of the member.

This application claims priority from Japanese Patent Application No. 2003-368464 filed Oct. 29, 2003, which is hereby incorporated by reference herein.

What is claimed is:

1. A method of inspecting a positional deviation in a predetermined XY-plane of a top position of a convex surface of a protruding portion formed on a flat member and a deepest position of a concave surface constituting a back surface of the convex surface, the method comprising:

applying light to the concave surface from below a portion assumed to be a center of the concave surface of the protruding portion in a direction toward the predetermined XY-plane and photographing an image obtained through reflection of the light;

obtaining coordinates in the predetermined XY-plane of the deepest position of the concave surface based on the image;

photographing the convex surface of the protruding portion by a front camera having an image taking optical axis parallel to the predetermined XY-plane and directed toward the flat member;

obtaining coordinates in the predetermined XY-plane of the top position of the convex surface based on an image obtained by the front camera;

photographing the convex surface of the protruding portion by a side camera having an image taking optical axis parallel to the predetermined XY-plane, directed toward the flat member, and different from the image taking optical axis of the front camera;

obtaining coordinates in the predetermined XY-plane of the top position of the convex surface based on an image obtained by the side camera; and comparing the coordinates in the predetermined XY-plane of the deepest position of the concave surface with the coordinates in the predetermined XY-plane of the top position of the convex surface.

* * * * *